United States Patent
Queen, Jr. et al.

(10) Patent No.: US 7,322,147 B1
(45) Date of Patent: Jan. 29, 2008

(54) FISHING DEVICE

(76) Inventors: William E. Queen, Jr., 60022 Meadow La., Lawrence, MI (US) 49064; David B. Hadley, P.O. Box 504, Hartford, MI (US) 49057

( * ) Notice: Subject to any disclaimer, the term of this patent is extended or adjusted under 35 U.S.C. 154(b) by 0 days.

(21) Appl. No.: 11/454,021

(22) Filed: Jun. 15, 2006

(51) Int. Cl.
*A01K 91/10* (2006.01)

(52) U.S. Cl. .......................................................... 43/15

(58) Field of Classification Search .............. 43/15, 43/35, 37
See application file for complete search history.

(56) References Cited

U.S. PATENT DOCUMENTS

| | | | | |
|---|---|---|---|---|
| 945,091 | A | * | 1/1910 | Hanel .............................. 43/35 |
| 1,318,073 | A | * | 10/1919 | Gottschalk ....................... 43/35 |
| 2,041,634 | A | * | 5/1936 | Boyko ............................. 43/35 |
| 2,147,917 | A | * | 2/1939 | Noren ............................. 43/15 |
| 2,439,391 | A | * | 4/1948 | Jobson ............................ 43/35 |
| 2,445,461 | A | * | 7/1948 | St John .......................... 43/35 |
| 2,521,555 | A | * | 9/1950 | Widmer .......................... 43/35 |
| 2,530,007 | A | * | 11/1950 | Euzent ........................... 43/15 |
| 2,544,782 | A | * | 3/1951 | Fawcett .......................... 43/35 |
| 2,568,999 | A | * | 9/1951 | Gunser ........................... 43/15 |
| 2,582,758 | A | * | 1/1952 | Rose .............................. 43/15 |
| 2,700,842 | A | * | 2/1955 | Lehmann ........................ 43/35 |
| 2,706,866 | A | * | 4/1955 | Lucchetti ....................... 43/15 |
| 2,722,764 | A | * | 11/1955 | Juhrend ......................... 43/35 |
| 2,729,013 | A | * | 1/1956 | Chandler ........................ 43/35 |
| 2,876,578 | A | * | 3/1959 | Argenio ......................... 43/15 |
| 2,906,051 | A | * | 9/1959 | O'Bryan ......................... 43/35 |
| 3,220,138 | A | * | 11/1965 | Greenfield ...................... 43/15 |
| 3,314,185 | A | * | 4/1967 | McCoy et al. .................. 43/15 |
| 3,574,265 | A | * | 4/1971 | Gibbons ......................... 43/35 |
| 3,786,587 | A | * | 1/1974 | Niileksela ...................... 43/35 |
| 3,816,953 | A | * | 6/1974 | Hameen-Anttila .............. 43/35 |
| 3,823,501 | A | * | 7/1974 | Bybee ............................ 43/15 |
| 3,974,588 | A | * | 8/1976 | Blom et al. .................... 43/15 |
| 4,011,679 | A | * | 3/1977 | Smith ............................. 43/15 |
| 4,026,058 | A | * | 5/1977 | Harris ............................ 43/15 |
| 4,136,477 | A | * | 1/1979 | Hines et al. .................... 43/15 |
| D274,080 | S | * | 5/1984 | Hall ............................ D22/149 |
| 5,123,196 | A | * | 6/1992 | Pagano et al. .................. 43/37 |
| 5,950,347 | A | * | 9/1999 | McQueeny ................. 43/42.04 |

(Continued)

FOREIGN PATENT DOCUMENTS

JP 2-49532 A * 2/1990

(Continued)

*Primary Examiner*—Darren W. Ark
(74) *Attorney, Agent, or Firm*—Dale J. Ream

(57) ABSTRACT

A fishing device includes a casing and a main spring positioned therein. A trigger spring is also positioned in the housing and a plate is interconnected to adjacent ends of the two springs. The device includes a primary latch operatively coupled to the casing and movable between a normally restricting configuration that normally holds the main spring in a compressed configuration and a releasing configuration. A latch release member is coupled to the trigger spring and the primary latch for moving the primary latch to the releasing configuration when the trigger spring is extended, say by the strike of a fish on a line coupled thereto. At the releasing configuration, the primary latch allows the main spring to decompress and this action sets a hook in a fish. When extended, the main spring absorbs shocks caused by a fish's movements while being reeled in.

20 Claims, 6 Drawing Sheets

U.S. PATENT DOCUMENTS 6,574,908 B1 * 6/2003 Sanner .......................... 43/36
2006/0137237 A1 * 6/2006 Tamian ......................... 43/15

FOREIGN PATENT DOCUMENTS

JP          3-76523 A      *  4/1991
JP         10-94352 A      *  4/1998
WO    WO-2005/094573 A2  * 10/2005

* cited by examiner

FISHING DEVICE

BACKGROUND OF THE INVENTION

This invention relates generally to fishing tackle and, more particularly, to a fishing device for attachment to or incorporation into a fishing lure that assists in setting a hook in a fish's mouth upon sensing a bite and that absorbs shocks caused by a fish's movement so as to decrease the likelihood that the fish will break the fishing line while being reeled in.

Every fisherman knows the frustration of sensing that a fish is nibbling at the bait or lure and then losing the fish when the hook is not set properly. Perhaps the fisherman's tug on the line was too quick, not quick enough, or not with the correct amount of force. Perhaps an even greater frustration is when a big fish is caught but then gets away when the fishing line is broken by the energetic movements of the fish while being reeled in.

Various devices have been proposed in the art for assisting in setting a hook when a fish strikes a lure. Although assumably effective for their intended purposes, the existing devices include constructions that are susceptible to being inadvertently tripped once placed in the water or are not easily set for use by a fisherman. Further, the existing devices do not solve the problem of line breakage upon sudden movements by a hooked fish.

Therefore, it would be desirable to have a fishing device for attachment to or incorporation into a fishing lure having a spring-loaded mechanism for assisting in properly setting a hook in a fish who is striking the lure. Further, it would be desirable to have a fishing device that decreases the likelihood of line breakage by absorbing the shock of sudden movements by a hooked fish. In addition, it would be desirable to have a fishing device that is easy for a fisherman to set before use and which is not susceptible to being inadvertently tripped during use.

SUMMARY OF THE INVENTION

Accordingly, a fishing device according to the present invention includes a main casing having opposed ends and defining a hollow interior space. A main spring is positioned inside the main housing. The main spring is the means for setting a hook when it is triggered. A trigger spring is also included in the main casing and is positioned between an end of the main spring and a second end of the casing. A primary latch is operatively coupled to the casing for movement between restricting and releasing configurations and is normally biased toward the restricted configuration. A secondary latch is also operatively coupled to the casing and movable between restricting and releasing configurations. The secondary latch, however, is biased toward a releasing configuration and is useful in setting the device for use.

A mounting plate is operatively coupled intermediate the primary and trigger springs. The mounting plate cooperates with the primary latch to hold the main spring at a compressed configuration. The mounting plate also cooperates with the secondary latch to maintain the main spring at the compressed configuration while initially preparing the device for use. A first fishing line may be connected to the first end of the casing and ultimately to a fishing pole. A second fishing line may connect the latch release member to a hook. In use, a movement of the second line indicative of a fish strike trips the latch release member which causes the main spring to be released to set the hook in a fish.

Therefore, a general object of this invention is to provide a fishing device that may be attached to or incorporated into a fishing lure for assisting in setting a hook in a fish's mouth.

Another object of this invention is to provide a fishing device, as aforesaid, that minimizes the risk of line breakage by absorbing forces characteristic of sudden movements by a hooked fish.

Still another object of this invention is to provide a fishing device, as aforesaid, that minimizes inadvertent tripping when in the water.

Yet another object of this invention is to provide a fishing device, as aforesaid, having a secondary latch assembly for assisting a fisherman in setting the device for use.

A further object of this invention is to provide a fishing device, as aforesaid, having a dual spring construction such that a triggering spring senses a strike and causes a main spring to release and set the hook.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

A fishing device 100 according to the present invention will now be described in detail with reference to FIGS. 1 through 6b of the accompanying drawings. More particularly, a fishing device 100 according to the current invention includes a main casing 110, a main spring 120, and a trigger spring 125.

Figure 1:
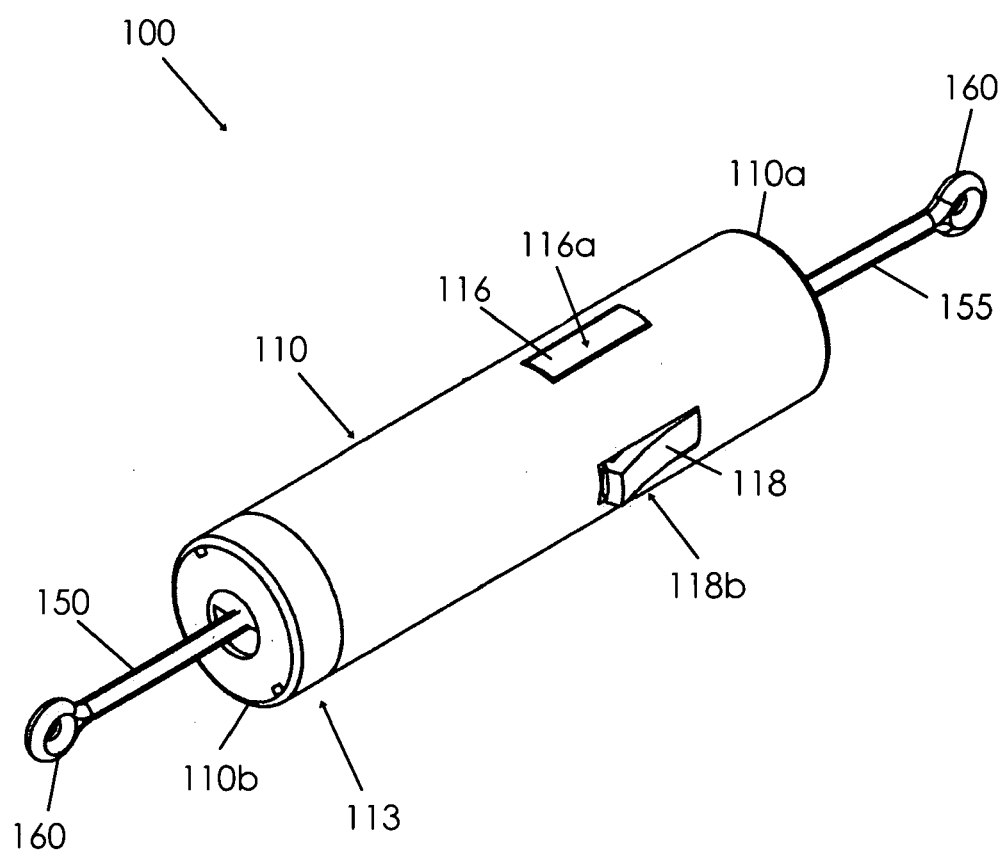
FIG. 1 is a perspective view of a fishing device according to a preferred embodiment of the present invention.
Figure 2:
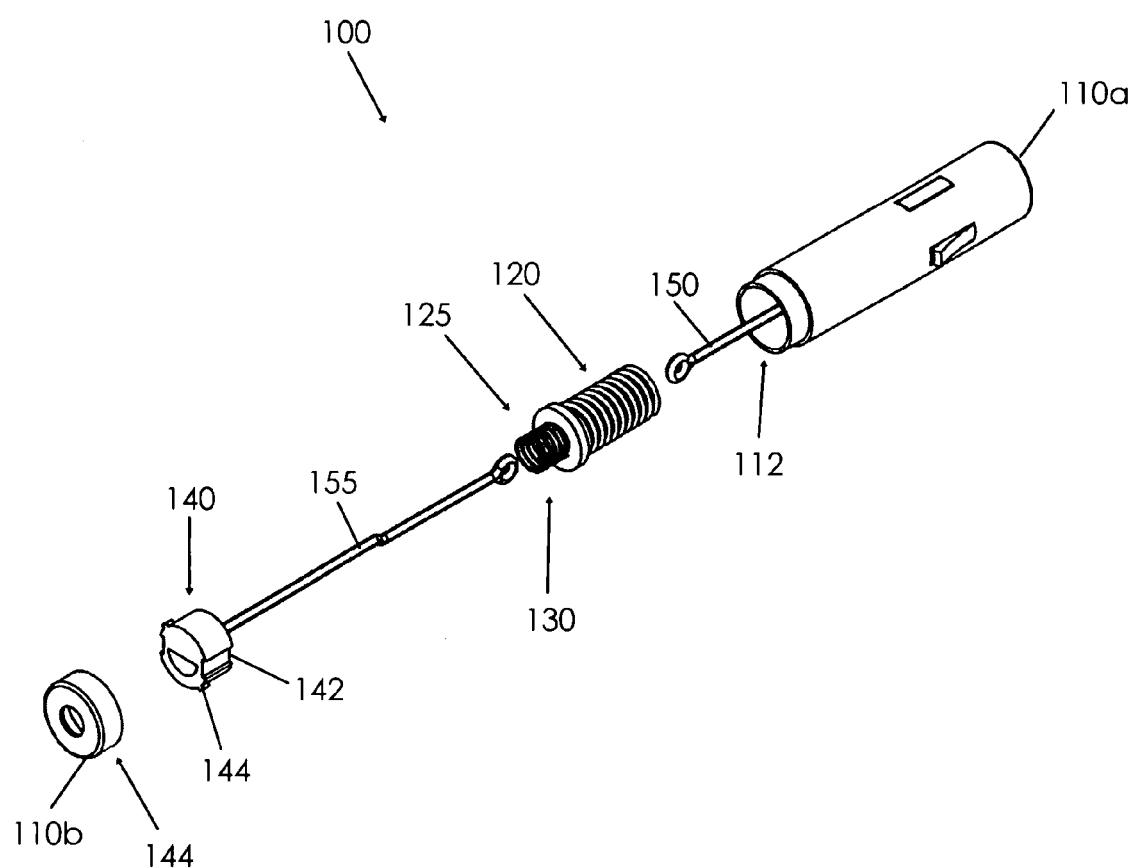
FIG. 2 is an exploded view of the fishing device as in FIG. 1.
Figure 6A:
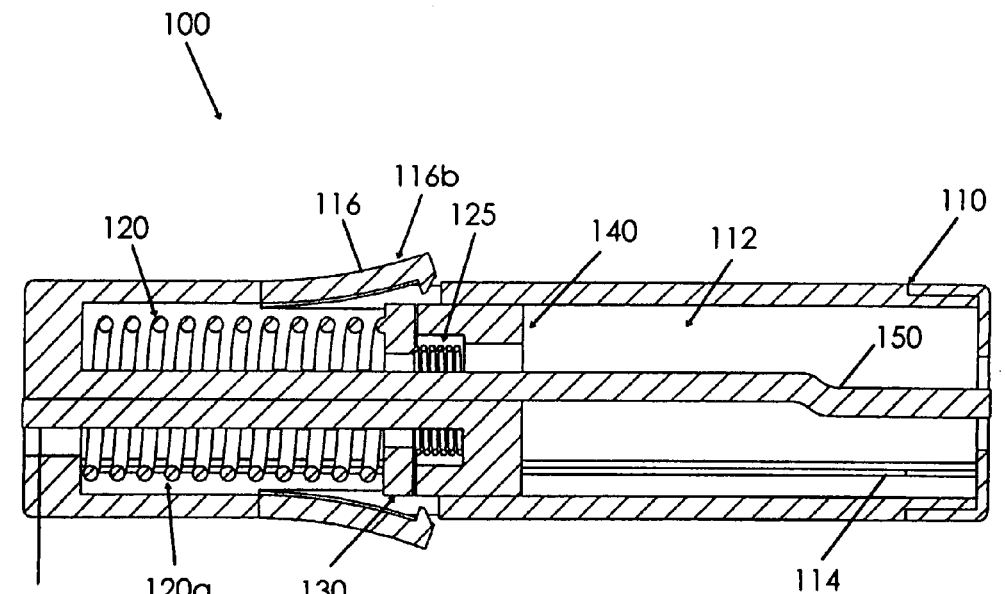
FIG. 6a is another sectional view as in FIG. 4a on an enlarged scale.
Figure 6B:
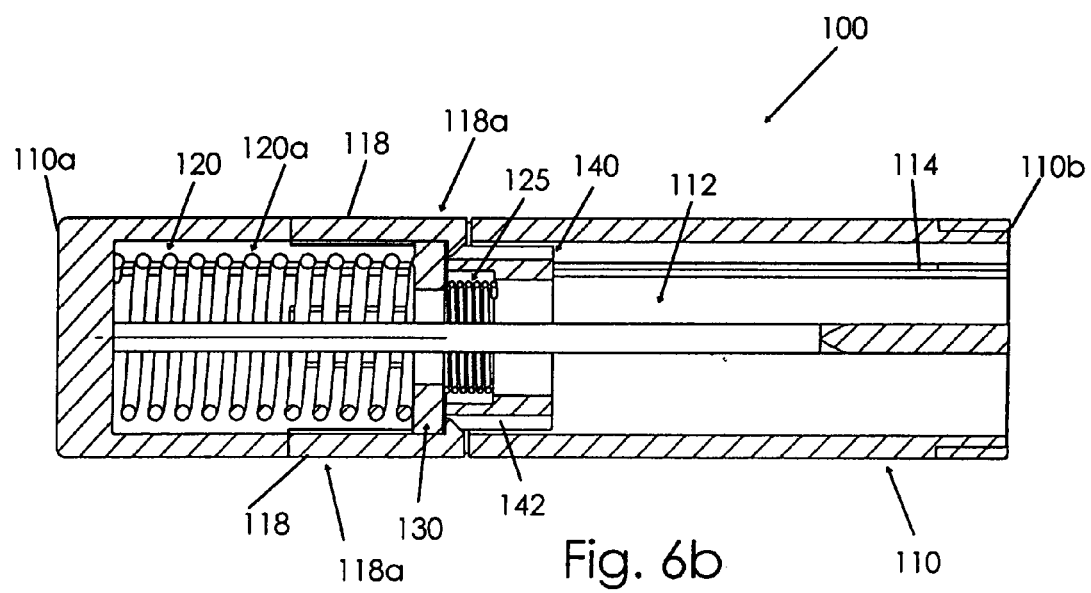
FIG. 6b is another sectional view as in FIG. 6a illustrating a secondary latch in a restricting configuration.

The main casing 110 (also referred to herein as "casing") defines an open interior space 112 and has first and second ends 110a, 110b. The casing 110 may be tubular (as shown in FIGS. 1 through 4b, 6a, and 6b), the casing 110 may define a fishing lure 111 (FIG. 5), or the casing 110 may be of another shape. The first end 110a and/or the second end 110b may be a cap 113, as best shown in FIG. 2, and the casing 110 may define one or more channel 114 adjacent the interior space 112, as best shown in FIGS. 6a and 6b. Though not shown in the drawings, the casing 110 may be understood to have an imaginary center axis extending between the first and second ends 110a, 110b. A primary latch 116 may be operatively coupled to the casing 110 for movement between a restricting configuration 116a (FIG.

3b) and a releasing configuration 116b (FIG. 4a), and a secondary latch 118 may be operatively coupled to the main casing 110 for movement between a restricting configuration 118a (FIG. 6b) and a releasing configuration 118b (FIG. 6a). The primary latch 116 is preferably biased toward the restricting configuration 116a, and the secondary latch 118 is preferably biased toward the releasing configuration 118b.

As shown in FIGS. 3b through 4b, the main spring 120 is positioned inside the open interior space 112 adjacent the first end 110a of the casing 100. More particularly, the main spring 120 may have a first end 122a adjacent the first end 110a of the casing 100 and a second end 122b extending toward the second end 110b of the casing 100. The trigger spring 125 is positioned inside the open interior space 112 between the main spring 120 and the second end 110b of the casing 110. The trigger spring 125 has first and second ends 126a, 126b. The trigger spring 125, preferably has a spring rate (also called a spring constant or a spring stiffness and typically measured in pounds per inch or Newtons per meter) that is less than the spring rate of the main spring 120. The trigger spring 125 will sometimes be referred to as the "secondary" spring in the description of the present invention in that it is secondary to the main or primary spring 120.

Figure 3A:
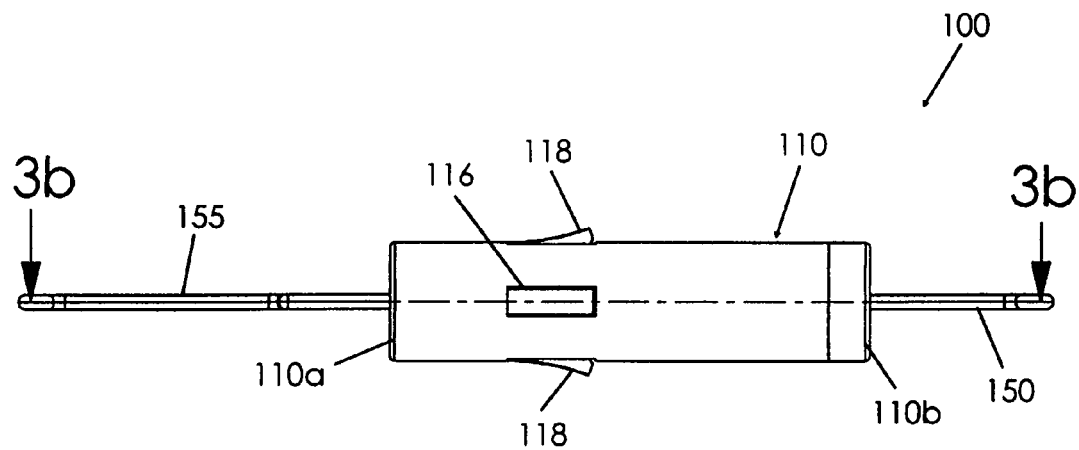
FIG. 3a is side view of the fishing device as in FIG. 1.
Figure 3B:
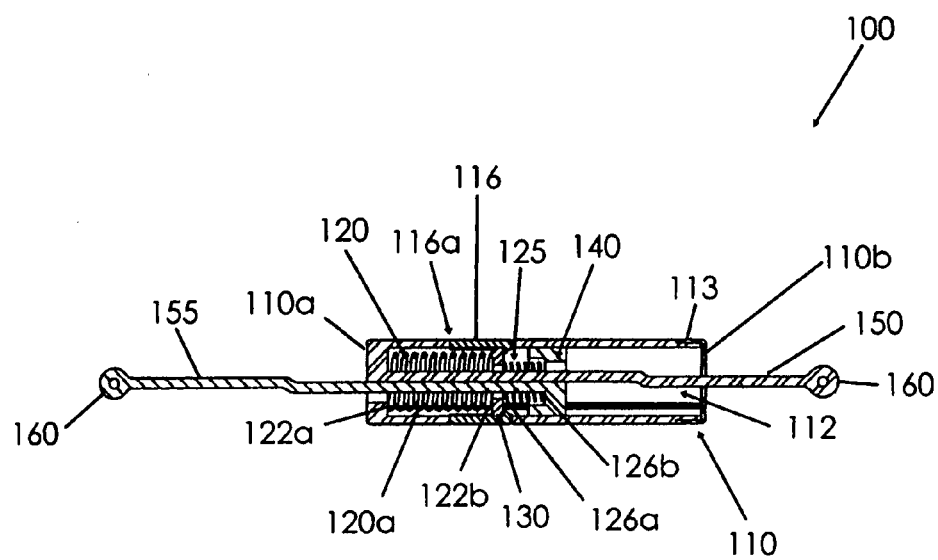
FIG. 3b is a sectional view taken along line 3b-3b of FIG. 3a illustrating a primary latch in a restricting configuration.

A mounting plate 130 may be operatively coupled to the main spring 120 and the trigger spring 125. More particularly, the mounting plate 130 may be operatively coupled to the second end 122b of the main spring 120 and the first end 126a of the trigger spring 125 (FIG. 3b). The mounting plate 130 is selectively cooperable with the primary latch 116 when the primary latch is at the restricting configuration 116a to maintain the main spring 120 at a compressed configuration 120a (FIG. 3b). As shown in FIG. 6b, the mounting plate 130 may be selectively cooperable with the secondary latch 118 when the secondary latch 118 is at the restricting configuration 118a to maintain the main spring 120 at the compressed configuration 120a.

A latch release member 140 may be operatively coupled to the trigger spring 125 (e.g., operatively coupled to the second end 126b of the trigger spring 125), and the latch release member 140 may be selectively cooperable with the primary latch 116 to move the primary latch 116 to the releasing configuration 116b. As best shown in FIGS. 2 and 6b, the latch release member 140 may define a groove 142 complementary to the secondary latch 118 to restrict interaction between the latch release member 140 and the secondary latch 118. The latch release member 140 may have a tab 144 (FIG. 2) complementary to the channel 114, and the tab 144 may be positioned in the channel 114 to orient the latch release member 140 to restrict interaction between the latch release member 140 and the secondary latch 118 and to permit interaction between the latch release member 140 and the primary latch 116.

A first line 150 (fishing line) extends from the first end 110a of the casing 110 through the open interior space 112 and beyond the second end 110b of the casing 110, and a second line 155 extends from the latch release member 140 through the open interior space 112 and beyond the first end 110a of the casing 110, as shown in FIGS. 3b through 4b. The first and second lines 150, 155 may be adjacent the imaginary center axis discussed above. Means for operatively coupling a hook (not shown) to the second line 155 and means for operatively coupling a fishing pole (not shown) to the first line 150 may be included. More particularly, eyelets 160 may be coupled to the first line 150 and the second line 155 to allow the first line 150 to be coupled to a fishing pole and the second line 155 to be coupled to a hook.

In use, the fishing device 100 may be placed between a fishing pole and a fishing hook to set the hook in a fish. Line (not shown) from the fishing pole may be coupled to the eyelet 160 at the first line 150, and line (not shown) from the hook may be coupled to the eyelet 160 at the second line 155. Alternately, the hook may be coupled directly to the eyelet 160 at the second line 155.

Figure 4A:
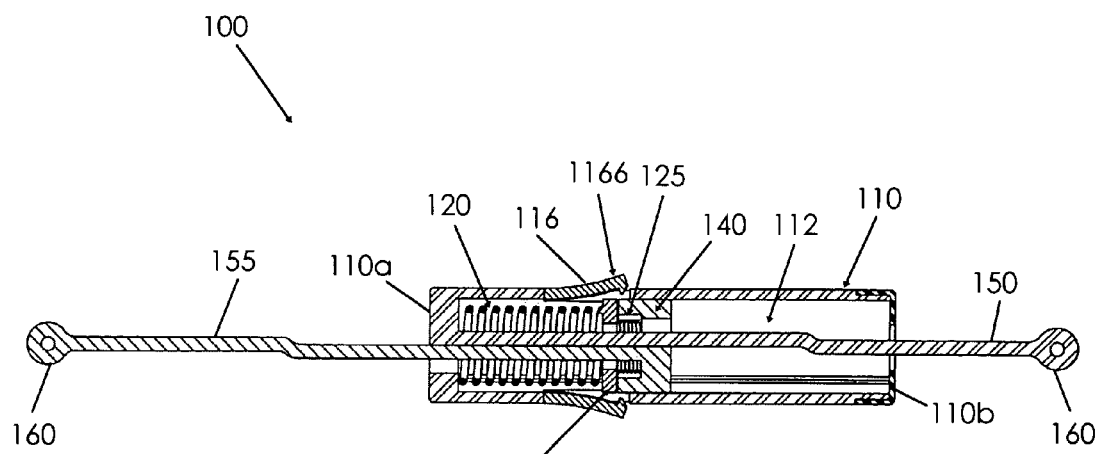
FIG. 4a is sectional view as in FIG. 3b illustrating a primary latch in a releasing configuration and the main spring still at a compressed configuration.
Figure 4B:
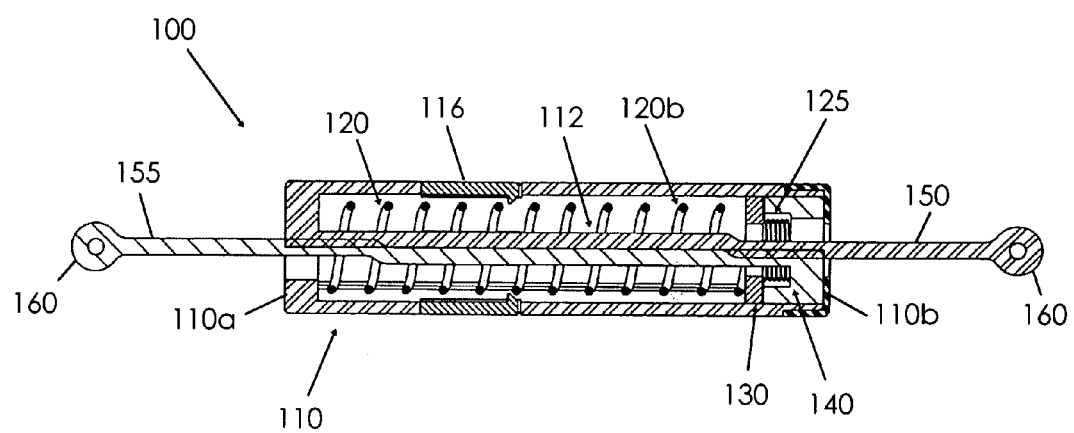
FIG. 4b is a sectional view as in FIG. 4a with the main spring at an extended configuration.
Figure 5:
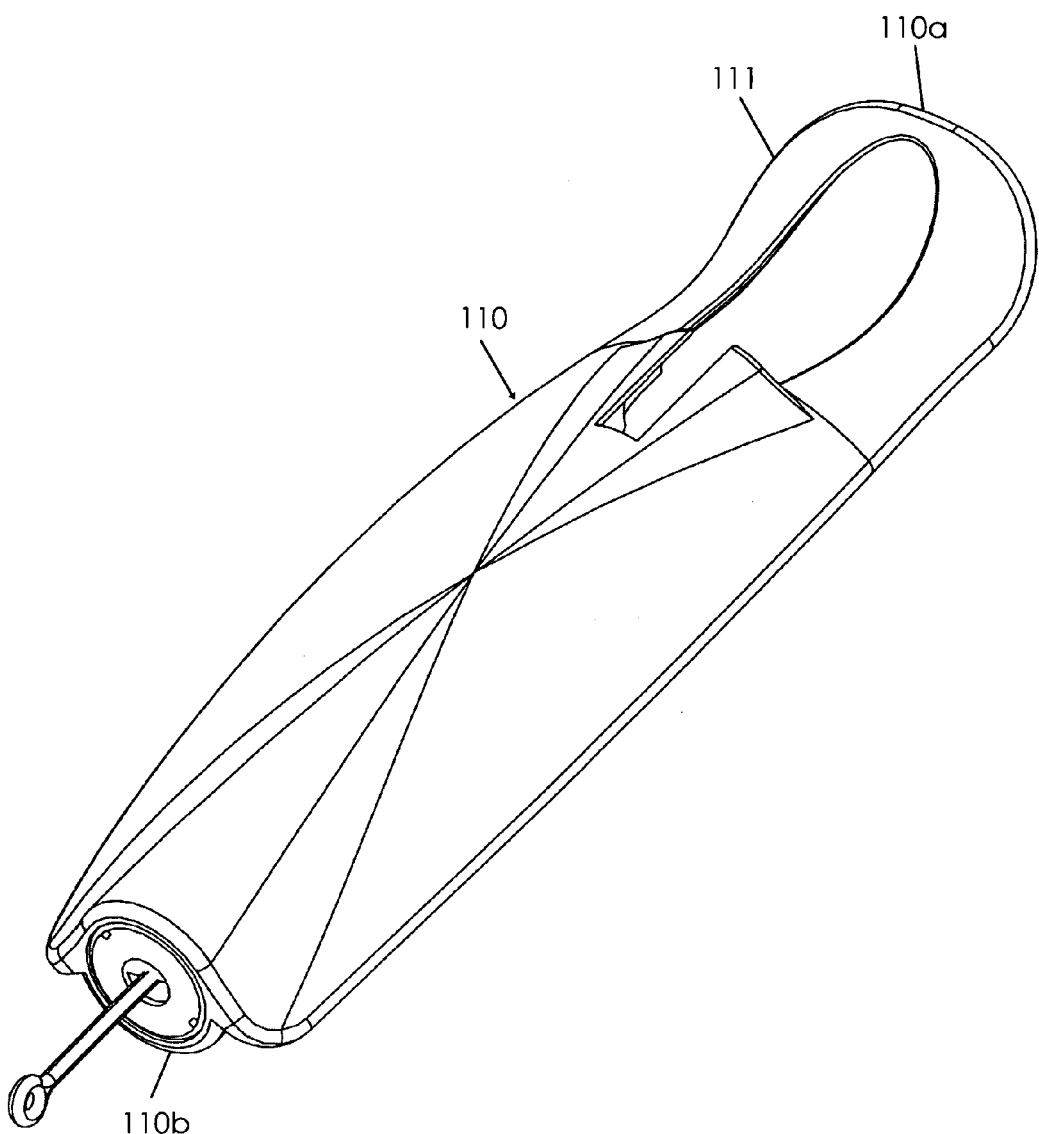
FIG. 5 is a perspective view of a fishing device integrated with a fishing lure.

FIG. 3b shows the fishing device 100 at a readied configuration wherein the main spring 120 is at the compressed configuration 120a and the primary latch 116 is at the restricting configuration 116a. When the second line 155 moves in a direction away from the second end 110b of the casing 110 (i.e., due to a fish pulling on the hook), the trigger spring 125 is compressed and the latch release member 140 moves the primary latch 116 to the releasing configuration 116b (FIG. 4a). When the primary latch 116 moves to the releasing configuration 116b, the main spring 120 moves from the compressed configuration 120a to an extended configuration 120b (FIG. 4b), and the movement of the main spring 120 to the extended configuration 120b moves the mounting plate 130, the trigger spring 125, the latch release member 140, and the second line 155 toward the second end 110b of the casing 110. The movement of the second line 155 toward the second end 110b sets the hook in the fish.

Once the main spring 120 is at the extended configuration 120b (FIG. 4b), the fishing device 100 may act as a shock absorber to dampen forces caused by the fish and/or the fishing pole, and the fish may be brought to the fishing pole by reeling or another fishing method.

To return the fishing device 100 to the readied configuration, the first and second lines 150, 155 may be pulled in opposite directions to move the main spring 120 to the compressed configuration 120a (FIGS. 6a and 6b). The secondary latch 118 may then be held in the restricting configuration 118a to cooperate with the mounting plate 130 and maintain the main spring 120 at the compressed configuration 120a (FIG. 6b). The second line 155 may then be released, allowing the trigger spring 125 to extend and the primary latch 116 to cooperate with the mounting plate 130 and maintain the main spring 120 at the compressed configuration 120a (FIG. 3b). When released, the secondary latch 118 may return to the releasing configuration 118b due to its normal bias as discussed above.

It is understood that while certain forms of this invention have been illustrated and described, it is not limited thereto except insofar as such limitations are included in the following claims and allowable functional equivalents thereof.

What is claimed is:

1. A fishing device, comprising:
   a main casing having first and second ends defining an open interior space and defining a longitudinal axis between said first and second ends;
   a main spring positioned inside said open interior space along said longitudinal axis, said main spring having a first end adjacent said first end of said main casing and a second end extending toward said second end of said main casing;
   a trigger spring positioned inside said open interior space along said longitudinal axis between said main spring and said second end of said main casing, said trigger spring having first and second ends;
   a primary latch operatively coupled to said main casing for movement between a restricting configuration and a releasing configuration, said primary latch being biased toward said restricting configuration;
   a secondary latch operatively coupled to said main casing for movement between a restricting configuration and a releasing configuration, said secondary latch being biased toward said releasing configuration;

a mounting plate is positioned along said longitudinal axis and operatively coupled to and sandwiched between said second end of said main spring and said first end of said trigger spring such that said mounting plate abuts said second end of said main spring and said first end of said trigger spring, said mounting plate being selectively cooperable with said primary latch when said primary latch is at said restricting configuration to maintain said main spring at a compressed configuration, said mounting plate being selectively cooperable with said secondary latch when said secondary latch is at said restricting configuration to maintain said main spring at said compressed configuration;

a latch release member operatively coupled to said second end of said trigger spring, said latch release member being selectively cooperable with said primary latch to move said primary latch to said releasing configuration;

a first line extending from said first end of said main casing through said open interior space and beyond said second end of said main casing;

a second line extending from said latch release member through said open interior space and beyond said first end of said main casing; and wherein said mounting plate, said trigger spring, and said second line are moved toward said second end of said casing when said main spring is moved from said compressed configuration to an extended configuration.

2. The device of claim 1, wherein said latch release member defines a groove complementary to said secondary latch to restrict interaction between said latch release member and said secondary latch.

3. The device of claim 2, wherein:
said main casing defines a channel adjacent said interior space;
said latch release member has a tab complementary to said channel; and
said tab is positioned in said channel to orient said latch release member to restrict interaction between said latch release member and said secondary latch and to permit interaction between said latch release member and said primary latch.

4. The device of claim 1, wherein said trigger spring has a spring rate that is less than a spring rate of said main spring.

5. The device of claim 1, further including means for operatively coupling a hook to said second line.

6. The device of claim 1, wherein:
said first line is adjacent said longitudinal axis; and
said second line is adjacent said longitudinal axis.

7. The device of claim 1, wherein said main casing defines a fishing lure.

8. The device of claim 1, wherein one of said main casing first end and said main casing second end is a cap.

9. The device of claim 1, wherein:
movement of said second line in a direction away from said second end of said main casing causes said trigger spring to compress and said latch release member to move said primary latch to said releasing configuration;
said main spring moves from said compressed configuration to an extended configuration when said primary latch moves to said releasing configuration; and
said movement of said main spring to said extended configuration moves said mounting plate, said trigger spring, said latch release member, and said second line toward said second end of said main casing.

10. A fishing device for use between a fishing pole and a fishing hook to set the hook in a fish, said device comprising:
a casing defining an open interior space and having first and second ends, said casing defining a longitudinal axis extending between said first and second ends;
a main spring situated inside said open interior space along said longitudinal axis, said main spring having a first end adjacent said first end of said casing and a second end extending toward said second end of said main casing;
a trigger spring situated inside said open interior space along said longitudinal axis and between said main spring and said second end of said casing, said trigger spring having first and second ends;
a primary latch operatively coupled to said casing for movement between a restricting configuration and a releasing configuration, said primary latch being biased toward said restricting configuration;
a mounting plate is positioned along said longitudinal axis and operatively coupled to and sandwiched between said main spring and said trigger spring such that said mounting plate abuts said second end of said main spring and said first end of said trigger spring, said mounting plate being selectively cooperable with said primary latch when said primary latch is at said restricting configuration to maintain said main spring at a compressed configuration;
a latch release member operatively coupled to said trigger spring, said latch release member being selectively cooperable with said primary latch to move said primary latch to said releasing configuration;
a first line extending from said first end of said casing through said open interior space and beyond said second end of said casing; and
a second line extending from said latch release member through said open interior space and beyond said first end of said casing.

11. The device of claim 10, wherein:
a secondary latch is operatively coupled to said casing for movement between a restricting configuration and a releasing configuration;
said secondary latch is biased toward said releasing configuration; and
said mounting plate is selectively cooperable with said secondary latch when said secondary latch is at said restricting configuration to maintain said main spring at said compressed configuration.

12. The device of claim 11, wherein said latch release member defines a groove complementary to said secondary latch to restrict interaction between said latch release member and said secondary latch.

13. The device of claim 12, wherein:
said casing defines a channel adjacent said interior space;
said latch release member has a tab complementary to said channel; and
said tab is positioned in said channel to orient said latch release member to restrict interaction between said latch release member and said secondary latch and to permit interaction between said latch release member and said primary latch.

14. The device of claim 13, wherein:
said trigger spring has a spring rate that is less than a spring rate of said main spring;
said first line is adjacent said longitudinal axis;
said second line is adjacent said longitudinal axis;
movement of said second line in a direction away from said second end of said casing causes said trigger spring to compress and said latch release member to move said primary latch to said releasing configuration;

said main spring moves from said compressed configuration to an extended configuration when said primary latch moves to said releasing configuration; and said movement of said main spring to said extended configuration moves said mounting plate, said secondary spring, said latch release member, and said second line toward said second end of said main casing.

15. The device of claim 10, wherein said trigger spring has a spring rate that is less than a spring rate of said main spring.

16. The device of claim 10, further including:

means for operatively coupling a hook to said second line; and means for operatively coupling a fishing pole to said first line.

17. The device of claim 10, wherein:

said first line is adjacent said axis; and said second line is adjacent said axis.

18. The device of claim 10, wherein said main casing defines a fishing lure.

19. The device of claim 10, wherein one of said casing first end and said casing second end is a cap.

20. The device of claim 10, wherein:

movement of said second line in a direction away from said second end of said casing causes said trigger spring to compress and said latch release member to move said primary latch to said releasing configuration;

said main spring moves from said compressed configuration to an extended configuration when said primary latch moves to said releasing configuration;

said movement of said main spring to said extended configuration moves said mounting plate, said trigger spring, said latch release member, and said second line toward said second end of said main casing; and wherein said mounting plate, said trigger spring and said second line are moved toward said second end of said casing when said main spring is moved from said compressed configuration to an extended configuration.

* * * * *